June 11, 1957   F. SCHAUB   2,795,329
SEPARATION OF GRANULAR MATERIALS
Filed July 14, 1953   3 Sheets-Sheet 3

INVENTOR
FRANZ SCHAUB
BY Burgess and Dinklage
ATTORNEYS

United States Patent Office 2,795,329
Patented June 11, 1957

---

2,795,329

SEPARATION OF GRANULAR MATERIALS

Franz Schaub, Oberhausen-Holten, Germany, assignor to Ruhrchemie Aktiengesellschaft, Oberhausen-Holten, Germany, a corporation of Germany Application July 14, 1953, Serial No. 367,927

Claims priority, application Germany July 25, 1952

8 Claims. (Cl. 209—139)

This invention relates to improvements in the separation of granular materials, and particularly of artificial fertilizers, granulated catalysts, grains, seeds, coal.

In United States patent application, Serial No. 301,453, filed July 29, 1952, now Patent No. 2,766,880, a process is described for the separation of fine-grained portions from granular materials. In accordance with the said application, the granular materials to be treated are passed downwardly through a substantially vertical separation zone and distributed in the zone in a widely spread stream or curtain. A rising gas stream is passed upward through the zone at a low flow velocity sufficient to carry the fine-grain portion of the granular material along with it and allow the remainder of the granular material to pass counter-current thereto. The fine grained portions are removed from the upper portion of the separation zone with the gas stream and the remainder of the granular material is removed from the lower portion of the separation zone. This process in the said application is adopted for the dedusting and particle-size classification of granular materials, and particularly fertilizers, as, for example, calcium ammonium nitrate.

For carrying out the process of the said application, an apparatus is provided which comprises a substantially vertcial cylindrical shaft which conically narrows at its bottom to define the discharge opening for the granular material. An inlet pipe is centrally positioned at the top of the shaft and a distribution cone is centrally positioned in the shaft below the inlet pipe. A louvered gas inlet is provided at the lower portion of the shaft and an outlet for gas and fine-grained material is provided at the upper portion of the shaft. In the apparatus, however, the mixture of material, while falling downwardly, will not uniformly contact the rising gas stream and thus a complete and uniform dust removal is not then effected and/or additionally a relatively large quantity of gas is required.

One object of this invention is to avoid the above-mentioned disadvantages and to provide an apparatus which will effect a uniform contacting of rising gas with the granular material to be treated, and which requires a relatively small quantity of gas, such as air. These, and still further objects will become apparent from the following description, read in conjunction with the drawing, in which.

Figure 1:
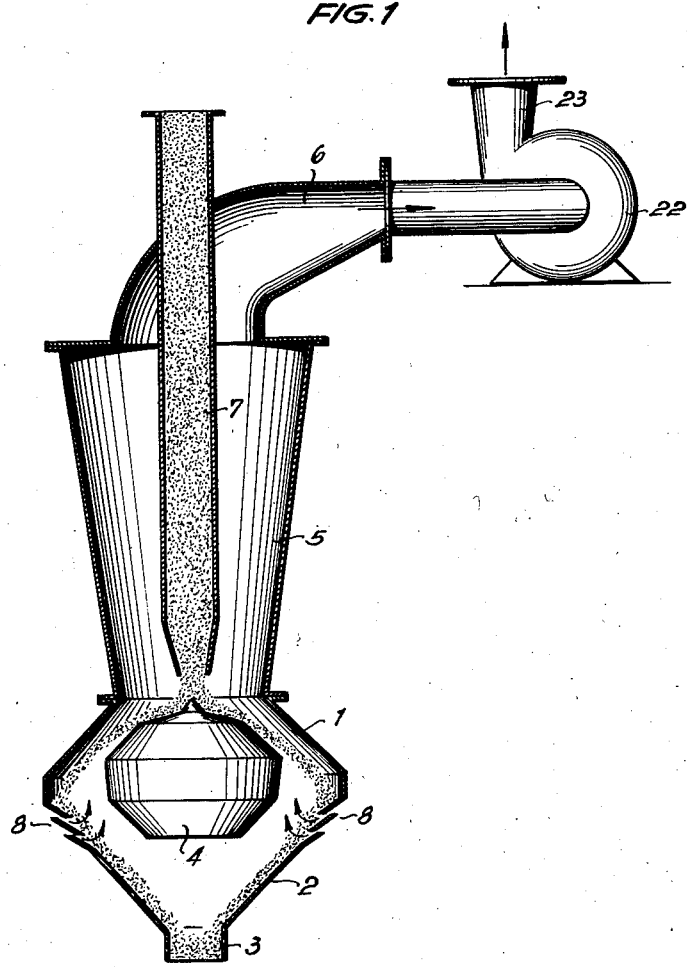
Fig. 1 shows a vertical section of an embodiment of an apparatus in accordance with the invention.

In accordance with the invention, the apparatus for the dedusting and classification of granular materials and particularly artificial fertilizers, is provided with a substantially vertical annular separation space which slopes outwardly in the downward direction. This space is defined by the inner surface of a container and a displacing body centrally positioned in the container spaced a relatively small distance from the container walls. The opposed portions of the container and the displacing body are preferably of conical shape, so that the annular separation space defined therebetween is of a frusto-conical shape. An inlet of granular material is provided at the upper portion of the chamber, so that granular material passed therethrough would pass on top of the displacing body. The top of the displacing body is so dimensioned, i. e., sloping outwardly in a downward direction, that the material passed thereover will flow towards the surrounding container wall. In this manner a substantial enlargement of the surface of the stream of material is obtained, which allows particularly good action of the separating gas, such as air on the mixture of a material to be freed from dust. Means, such as a louvered gas inlet, is provided at the lower portion of the container for the passage of gas upward through the annular separating space. An outlet for the granular material is provided at the lower portion of the container and an outlet for the gas dust is provided at the upper portion. The new apparatus, as compared with an apparatus having a circular classification space allows considerably larger quantities of material to be treated with a low gas requirement and with a high degree of selectivity, wihch, in most cases, is superior to the selectivity obtained in the prior apparatus with the circular separation space.

An essential improvement is obtained in the apparatus in accordance with the invention, since the material to be freed from dust or to be classified moves from the inner to the outer boundary surface of the annular separation space, so that each granular particle of material travels through the entire flow cross-section of the gas, such as the air, and thus all particles of granular material are subjected to the same lifting forces, even if the air velocity is not uniformly distributed. Only the very coarse grain constituents which range far above classification limit will fall from the air stream directly into the lower part of the apparatus and out of the discharge opening. The invention will be explained in further detail with reference to the drawings. In the embodiment shown in Fig. 1, the appaartus of a container which has a portion 1, which conically widens in a downward direction. Below the portion 1, the container is provided with the portion 2, which conically narrows in a downward direction and thus is funnel-shaped and terminates in the discharge opening 3. Within the portions of the container 1 and 2, a displacing body 4 of sheet material is provided. The displacing body has a top which slopes downwardly and thus will provide a path of flow for the granular material thereover toward the wall portion 1 of the container. The upper portion of the displacing body 4 is of conical shape and widens in a downward direction corresponding to the portion 1. An annular, vertical separation space is formed between the displacing body 4 and the inner surface of the portion 1 of the container. This annular separating space slopes outwardly in a downward direction and has a frusto-conical shape.

Above the displacing body 4 the container is provided with a conical section 5 which widens in an upward direction. This conical section is provided with an air outlet opening 6 with a centrally positioned material inlet pipe 7.

The material to be charged is passed in through a pipe 7, which, if necessary, or desired, may be adjustable in height. After passage through the pipe 7 the material strikes the top of the dispacing body 4 which acts as a distributor and the material streams outwardly thereover toward the opposing inner surface of the portion 1 of the container. As it passes outwardly over the displacing body, the granular material traverses the annular separation space defined between the displacing body 4 and the container wall portion 1. After traversing this space, the material finally drops near the inner surface of the funnel-shaped bottom portion 2 into the discharge opening 3. The air stream used for freeing the material from dust is blown or sucked in below the displacing body 4 through the louvered slots 8. A relatively high air velocity is maintained in the slots. The air inlet slots are arranged in such a manner that an effective reclassification of the coarse material flowing directly past the slot openings and already classified in the annular space will occur.

In the conically widening portion 5 above the displacing body 4, a reduction of the flow velocity of the air will occur so that coarse particles which were entrained, due to the different distribution of the velocity of the air stream would pass to the wall of the portion of the container 5 and will drop downwardly to be discharged as coarse grains.

Figure 2:
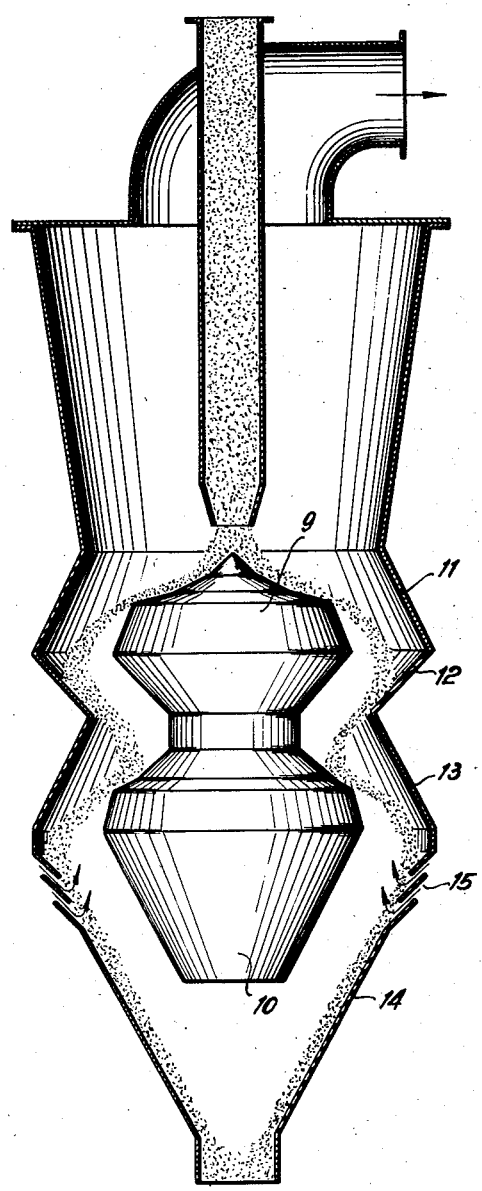
Fig. 2 shows a vertical section of a different embodiment of an apparatus in accordance with the invention.

In the embodiment as shown in Fig. 2, the displacing body 9 conically widens and then narrows at two places along the length thereof. The opposed walls of the chamber conically widen and narrow in a corresponding manner, so that two annular, downwardly outwardly sloping separation spaces are formed, one above the other. The upper space is defined between the wall portion 11, 12 and the opposed portion of the displacing body 9, while the lower space is formed between the wall portion 13, 14 and the opposed portion of the displacing body 10. With the use of such a displacing body which repeatedly widens and narrows in its cross-section, as portions 9 and 10 show, the granular material being treated will pass several times over the cross-section of the annular separating space. In this manner the gas, such as air, stream entering through the openings 15, is repeatedly caused to act upon the stream of material travelling downwardly and cause an excellent dust-removal or separation of the undesirable, small particles.

The range limit of the particle sizes to be separated in the apparatus in accordance with the invention and the separating effect, etc., may be influenced by varying the quantity of gas such as air blown in per unit time through the air slots in the lower portion of the chamber. The classification effect may still further be influenced and controlled by shifting the displacing body in relation to the opposed portion of the chamber wall.

Figure 3:
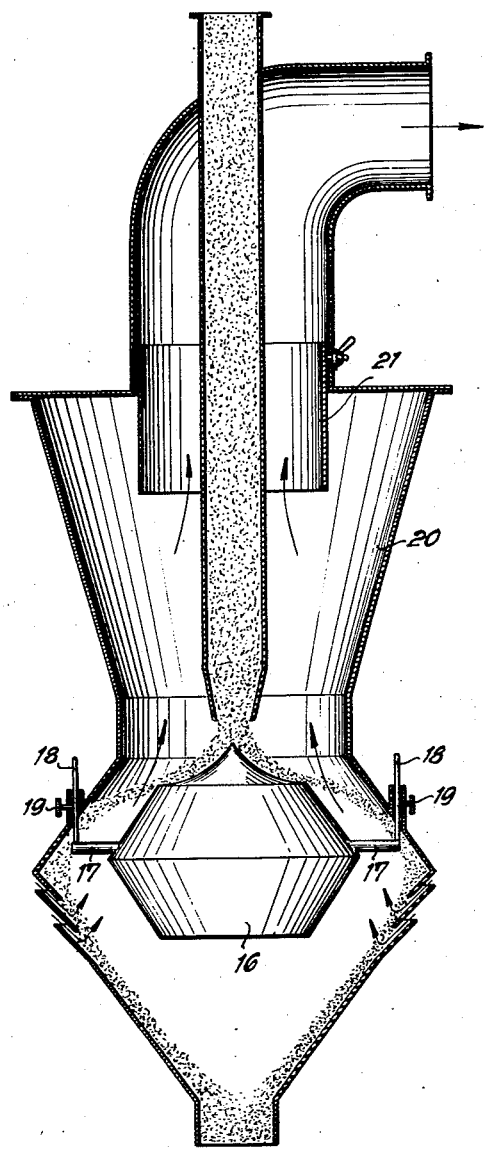
Fig. 3 shows a vertical section in still another embodiment of the invention having an adjustable displacing body.

In Fig. 3 an embodiment is shown which is suitable for this purpose. In this embodiment the displacing body 16, dimensioned and positioned in a similar manner to the displacing body 4 in Fig. 1, is supported by the posts 17 which are connected to the rods 18 which, in turn, extend through the chamber casing to the outside, and which may be adjusted to the desired position and set in that position by the screws 19. In this manner the displacing body 16 may be adjusted with respect to its distance from the adjacent chamber wall, and thus the cross-section of the annular separating space defined therebetween may be varied and adjusted. This permits a variation of the air velocity in the interior of the annular separation space, depending on the classifying effect desired.

In addition, the velocity of the air leaving the space 20, which has a certain influence on the separating effect, may be adjusted. This is effected with an adjustable tube or pipe 21, which may be extended into the portion of the chamber 20 to a greater or lesser extent, and thus vary the outlet velocity of the air.

The gases used for the dust removal in the apparatus according to the invention are sucked off preferably at the upper outlet opening by means of a blower. A centrifugal blower which is suitable to this purpose is represented in Fig. 1. This is a suction fan of sufficient capacity by means of which the air which enters through slots 8 and in place of which other gaseous media may be used is sucked off through the apparatus in an upward direction. The discharge connection 23 of the blower 22 is provided with a dust separator of known construction where the solid particles suspended in the form of dust in the gaseous medium are retained. It is possible, for example, to use the conventional cyclone separators for this purpose.

I claim:

1. Apparatus for the dust removal and classification of granular materials, such as artificial fertilizers, which comprises a substantially vertical chamber, a displacing body widening and narrowing at at least two places along the vertical length thereof positioned in said chamber, said displacing body and the adjacent wall portion of said chamber extending substantially parallel to each other to define therebetween at least two annular, downwardly sloping in an outwardly direction separating spaces positioned one above the other, inlet means positioned above said displacing body for passing granular material into said chamber for passage through said annular separating spaces, gas inlet means positioned horizontally adjacent to the lower portion of said displacing body for passing gas upwardly through said annular separating spaces, granular material discharge means positioned below the displacing body in the lower portion of said chamber and gas outlet means positioned in the upper portion of said chamber above said displacing body.

2. Apparatus according to claim 1 in which the top portion of said displacing body has an outwardly sloping surface defining the distributing means for distributing granular material passed through said inlet means over the cross-section of said annular separating spaces.

3. Apparatus according to claim 1, in which said chamber widens in an upward direction above said displacing body.

4. Apparatus according to claim 1, in which said displacing body has a downwardly widening conical portion and in which said chamber has an opposed corresponding portion to define therebetween a downwardly widening frusto-conical separation space.

5. Apparatus according to claim 4, in which said chamber conically widens in an upward direction above said displacing body.

6. Apparatus according to claim 5, in which the lower portion of said chamber is funnel-shaped, terminating in said granular material discharge means.

7. Apparatus according to claim 6, in which said gas inlet means is defined by louvered slots in said funnel-shaped portion.

8. Apparatus according to claim 7, in which said inlet means for granular material is an inlet pipe terminating above said displacing body.

References Cited in the file of this patent

UNITED STATES PATENTS

| 940,469 | Middleton | Nov. 16, 1909 |
| 1,522,151 | Stebbins | Jan. 5, 1925 |

FOREIGN PATENTS

| 233,745 | Germany | Apr. 21, 1911 |